Figure 1:
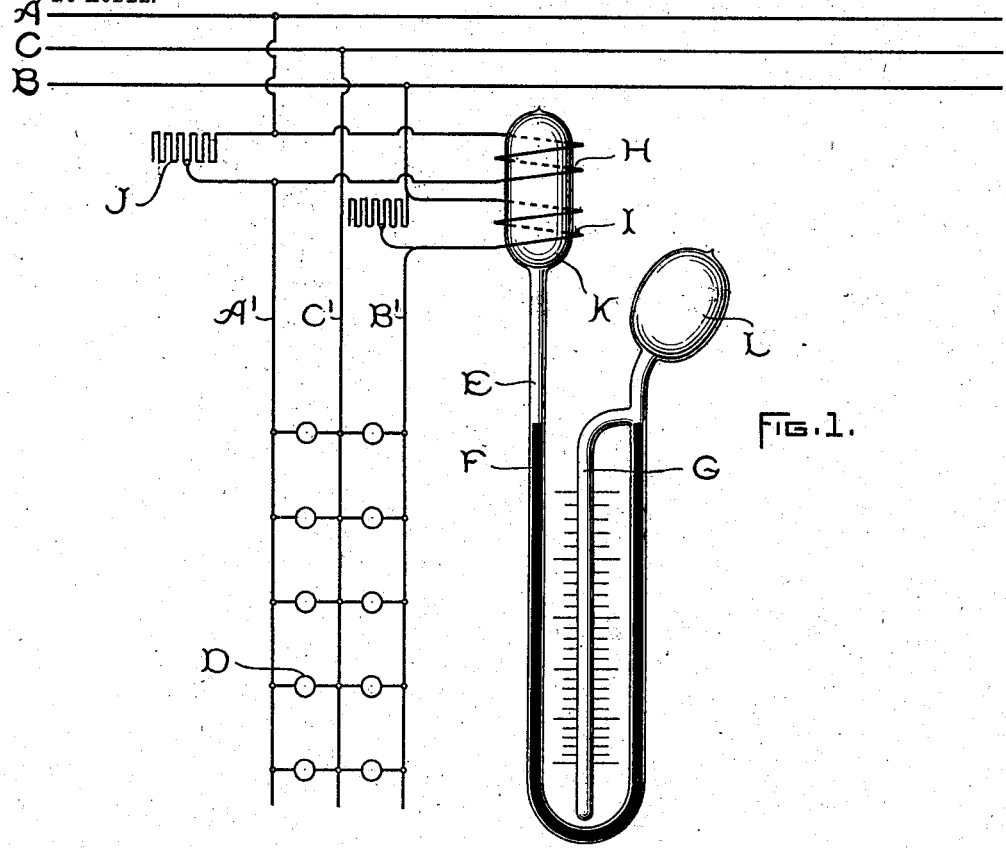

No. 728,546. PATENTED MAY 19, 1903.
F. P. COX.
MAXIMUM DEMAND INDICATOR.
APPLICATION FILED MAR. 2, 1899.

NO MODEL.

WITNESSES.
A. H. Abell.
A. F. Macdonald.

INVENTOR.
Frank P. Cox,
by Albert G. Davis
Atty.

No. 728,546. Patented May 19, 1903.

UNITED STATES PATENT OFFICE.

FRANK P. COX, OF LYNN, MASSACHUSETTS, ASSIGNOR TO THE GENERAL ELECTRIC COMPANY, A CORPORATION OF NEW YORK.

MAXIMUM-DEMAND INDICATOR.

SPECIFICATION forming part of Letters Patent No. 728,546, dated May 19, 1903.

Application filed March 2, 1899. Serial No. 707,456. (No model.)

*To all whom it may concern:*

Be it known that I, FRANK P. COX, a citizen of the United States, residing at Lynn, county of Essex, State of Massachusetts, have invented certain new and useful Improvements in Maximum-Demand Indicators, of which the following is a specification.

This invention relates to means for recording the maximum degree of electric energy which flows through any multicircuit system, with especial reference to the three-wire system of distribution, which is so widely in use at the present time. The recording means naturally and essentially executes a method of recording.

The idea of basing rates of charge to consumers of electric energy upon the maximum rate of flow for an appreciable time is not novel and many forms of meters for carrying out this idea have been invented. Such meters have been used with the three-wire system, in which case two maximum-meters have been used, each being connected with one of the outside wires, so that each circuit would actuate a separate meter. Each meter was read and the sum of the readings was taken as the maximum rate of current-flow. This has been considered satisfactory for some time and might be so considered for some time in the future in spite of the expense of two meters for a three-wire system and extra meters in proportion to the number of circuits. However, I have devised a novel apparatus by which not only is the extra cost of apparatus entirely unnecessary, but there are prevented certain very serious errors of the old method. In the old method the sum of the readings does not in all cases represent the actual maximum demand or rate of flow of energy. It represents the true rate only when the consumer uses the same number of lamps or other translating devices on both sides at all times—that is, when the load is equally balanced and no current flows in the neutral wire. This is exceptional, especially in the case of a householder, for example, even if an equal number of lamps be connected to each side of the system, for the use of these lamps may be varied very much and independently of the manner in which they are connected with the house-mains. For example, the consumer may one evening have ten lamps operating on one side of the system and none on the other side. In such a case the maximum-meter on one side will record a certain current—five amperes, for example—and the other meter will make no record. The next evening he may use ten lamps on the other side of the system and none on the first-mentioned side. In this case the maximum-meter on the other side will record a current of five amperes and the other meter will make no further record. The sum of the records of the two meters will be ten amperes; but the consumer has not in either evening exceeded a current of five amperes and the discount allowed him will be based on a maximum demand of one hundred per cent. in excess of the actual demand. This is an extreme case; but it is clear that a system in which such errors are possible is very objectionable.

The improved method consists in causing the energy flowing through each circuit of the system to operate a common maximum-recording device. If to the above-described illustrative case this method be applied, it will be seen that the maximum-meter which is common to both sides of the three-wire system will not make further record on the second evening, but that whenever a larger current than has yet been recorded flows through either circuit alone or both together the meter will record that maximum.

Figure 2:
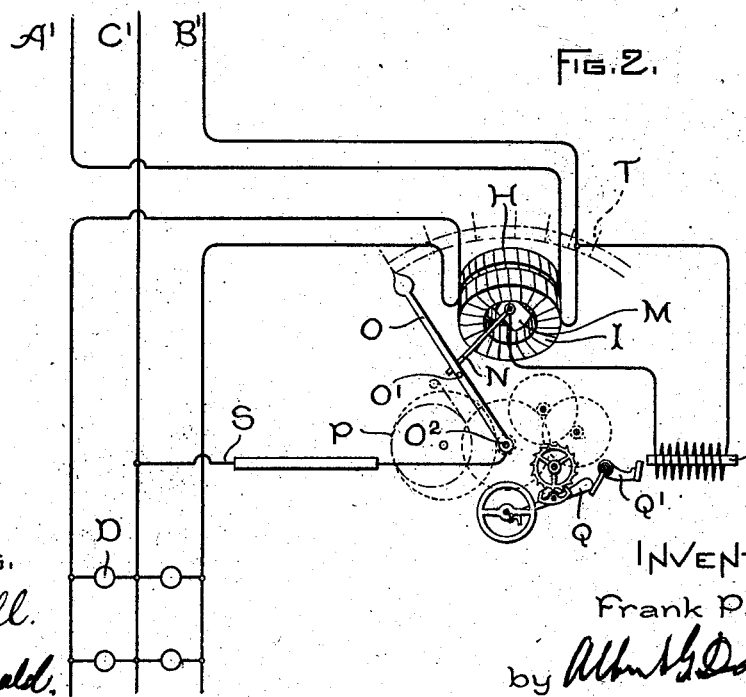

In the accompanying drawings, which illustrate an embodiment of my invention, Figure 1 is a diagrammatic view of a three-wire system having a maximum-demand indicator in circuit; and Fig. 2 is also a diagrammatic view of a three-wire system, but with a modified form of an indicator.

In so far as the operation of my invention is concerned it is immaterial what kind of maximum-indicator is used so long as it is affected by the current flowing in both sides of the three-wire system. Neither does it matter whether it is applied to alternating or direct current systems.

In the drawings I have shown two types of instruments; but it is evident that other forms may be employed.

The instrument shown in Fig. 1 is illustrated because it is so simple that it most clearly represents the application of the method.

Referring to Fig. 1, A and B indicate the two outside wires, and C the neutral wire, of a three-wire system. Extending from these wires are auxiliary or house mains A' B' C', which supply energy to the lamps or other translating devices D. The maximum-demand indicator consists of a U-shaped transparent tube E, having an enlargement or bulb K at one end, around which the heating-coils are placed, and an enlargement or bulb L, into which the fluid flows when it is desired to empty the middle tube G. The bulb K is preferably formed integral with the tube, and surrounding it are two heating-coils H and I. The former is connected in series with the main A' and the latter in series with the main B'. The tube E contains an indicating fluid, and the bulb K and that part of tube E between the bulb and the indicating fluid are filled with air or gas. The heating-coils H and I cause the temperature of the bulb to rise and the air or gas contained therein to expand, the expansion being proportional to the current flowing in the heating-coils. This expansion causes a portion of the indicating fluid to flow into the middle tube G, on the sides of which is a suitable scale by means of which readings may be made. The coils and tube are so proportioned and arranged that the momentary impulses of current will not cause the fluid F to overflow into the tube G; but if after a brief interval the current-flow still persists the temperature will rise to a point which causes the fluid in the bulb K to expand and the indicating fluid to flow into the tube.

Owing to the difficulty of making current-coils develop the same amount of heat for a given flow of current a resistance J is provided, by means of which more or less of the current may be shunted past one of the coils until its heating effect for a given load corresponds to the other coil. The resistance in addition to adjusting the coils with respect to each other performs another useful function, since it is useful for changing the rate of a given consumer. For example, suppose that an indicator has been installed at a given place where one rate of charge is established and it is desired to change the indicator to a place where a different rate is charged. To accomplish this, it is only necessary to change the amount of resistance shunting the heating-coils H and I, and the indicator will operate as desired.

Assuming that sufficient load is included between the mains A' B' C' to cause the heating-coils H and I to raise the temperature of the expansive fluid to a point above normal, the indicating fluid will then flow into the tube G and by its amount indicate the maximum demand on the central station. It will be noted that the same effect is obtained whether the load is all on one side or on the other or equally distributed between them.

The invention having been fully described with respect to one form of maximum-meter will now be described in its application to the meter shown in the patent to Fish, No. 631,289, in order to illustrate the statement on page 2, that the invention is not limited in its application to a maximum-meter of any specific construction.

Referring to Fig. 2, A', B', and C' indicate, respectively, the outside mains and the neutral of a three-wire system, and D indicates incandescent lamps or other translating devices. In circuit with the auxiliary main A' is a coil H, and in circuit with the auxiliary main B' is a coil I, and mounted for movement within these coils is an iron armature M. Thus far the arrangement of the coils and needle is the same as in an ordinary ammeter, except that two coils are employed instead of one. Mounted on the shaft of the instrument is a contact-arm N, which engages with a pin O', carried by the pointer O. The pointer O is mounted on a shaft $O^2$, which is driven by a clock of any suitable construction, the one shown being driven by the spring P in the ordinary manner. For convenience of illustration I have shown the spring and the gears of the clock in dotted lines. Mounted on the shaft which carries the escapement is an arm Q, which engages with a magnetically-actuated lever Q'. Situated in operative relation to this lever is an electromagnet R, and the winding thereon is connected between the outside main B' and the contact-arm N. Extending from the neutral wire C' to the pointer O is a connection S.

The operation will now be described: As the lamps or other translating devices are included in circuit with either or both sides of the system, the armature M is deflected and if this deflection is sufficient the contact-arm N is moved into engagement with the pin O'. As soon as this is done the circuit is complete from the main B' through the contact-arm N, pointer O, and wire S to the neutral wire C'. This attracts the armature of lever Q' and releases the escapement-lever Q and the clock begins to run. This operation continues until the pin O' on the pointer moves out of engagement with the contact-arm N. As soon as this is done the circuit of the energizing coil or magnet R is interrupted, the lever Q' assumes the position shown in the drawings due to gravity, and further movement of the escapement is prevented. The construction and arrangement of the parts are such that the pointer O can be moved forward by the clock mechanism over the scale T, (seen in dotted lines,) but it remains in its last position until manually returned by the inspector to its initial position.

Having thus described my invention, what I claim as new, and desire to secure by Letters Patent of the United States, is—

1. In a maximum-demand instrument for three-wire systems, the combination of an indicating means which is moved by the action of the current flowing in the system and is incapable of automatically returning to its initial position, and means controlled by the current flowing in both sides of the system for actuating the indicator.

2. In a maximum-demand instrument for use on systems of distribution other than two-wire, the combination of indicating means, which, as an indicator of the consumption of energy is capable of being moved in one direction only from its initial position, and means controlled by the load on more than one of the mains for moving the indicating means.

3. In a maximum-demand instrument for use on systems of distribution other than two-wire, the combination of indicating means which is capable of being moved in one direction only by the current flowing in the system, and always remains in the position of maximum even after the flow of current decreases, and coils which receive energy from at least two of the mains for actuating the indicating means.

4. In a maximum-demand instrument for use on three-wire systems, the combination of indicating means which is moved from its initial position by the energy consumed by the translating device in the circuit and is normally prevented from returning to its initial position, with coils, one in each of the outside mains of the system, for moving the indicating means.

5. In a maximum-demand instrument, the combination of indicating means which has no self-returning tendency but is moved away from its initial position by the action of the current in the system, and as the flow of current increases assumes a new position in accordance therewith, a plurality of coils for moving the indicating means and means for adjusting the power of the coils.

6. In a maximum-demand instrument for three-wire systems, the combination of a tube, a body of expansible fluid located therein which acts as an indicator, a coil included in circuit with each of the outside mains for heating the fluid, the two coils acting simultaneously and with an effect corresponding to the current flowing in the main in which they are located.

7. In a maximum-demand instrument for three-wire systems the combination of indicating means which is moved by increases in current strength, and by its position indicates the maximum demand on the central station, the indicating means always standing at the point of maximum demand irrespective of the amount of current being consumed at that time, heating-coils for moving the indicating means each coil being included in one of the outside mains of the system, and shunts for adjusting the effect of the coils.

8. The combination with a single device which is constructed and arranged to record the maximum flow of current, of means whereby the device is affected by the different circuits of a multicircuit system.

9. A single instrument, which is provided with indicating means, which, after it has been moved, cannot return to its initial position, and is caused to be moved whenever the degree of energy flowing through a multicircuit system is greater than that which has previously flowed through the system.

10. A single instrument which is provided with indicating means, which, after it has been moved, cannot return to its initial position, and a plurality of coils, each of which operates the said indicating means, and each of which is connected with one circuit of a multicircuit system.

11. A single instrument which comprises indicating means, which, after it has been moved, cannot return to its initial position, a plurality of coils, each of which operates said indicating means, and each of which is connected with a different circuit of a multicircuit system, and an adjustable resistance in each circuit in shunt to the coil.

12. A single instrument which records the maximum degree of electric energy which flows through a multicircuit system, and is provided with means for changing the rate of recording.

13. A single instrument which records the maximum degree of electric energy which flows through a multicircuit system, and is provided with means for causing any current in any circuit to make the same record as an equal current in any other circuit.

14. A single instrument which comprises a plurality of coils, each of which is connected with a different circuit in the multicircuit system, and a part which is movable in only one direction by one of said coils or by any number thereof coöperatively.

In witness whereof I have hereunto set my hand this 27th day of February, 1899.

FRANK P. COX.

Witnesses:
 DUGALD MCKILLOP,
 HENRY O. WESTENDARP.